Oct. 24, 1967  M. L. HOCH  3,348,594
FORAGE HARVESTER
Filed Sept. 3, 1965  3 Sheets-Sheet 1

Inventor:
Manfried L. Hoch
John J. Kowalik
Atty.

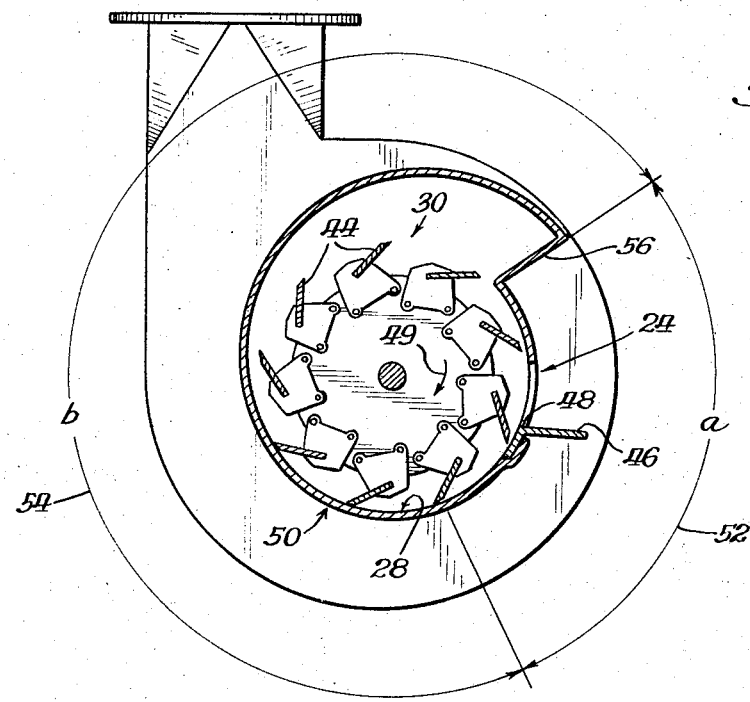
Fig. 3.
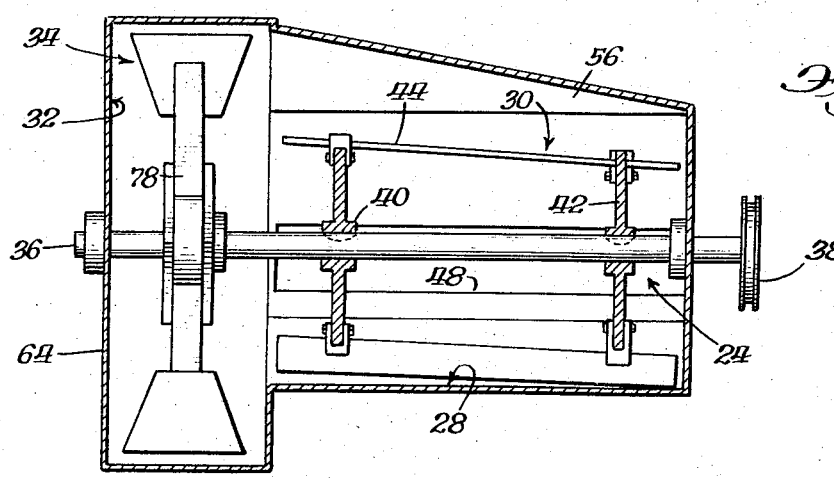
Fig. 4.
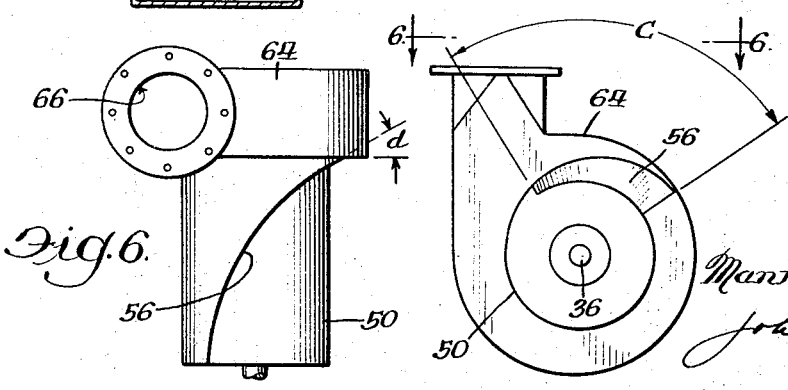
Fig. 5.
Fig. 6.
Inventor:
Manfried L. Hoch
John J. Kowalik
Atty.

Oct. 24, 1967  M. L. HOCH  3,348,594
FORAGE HARVESTER
Filed Sept. 3, 1965  3 Sheets-Sheet 3
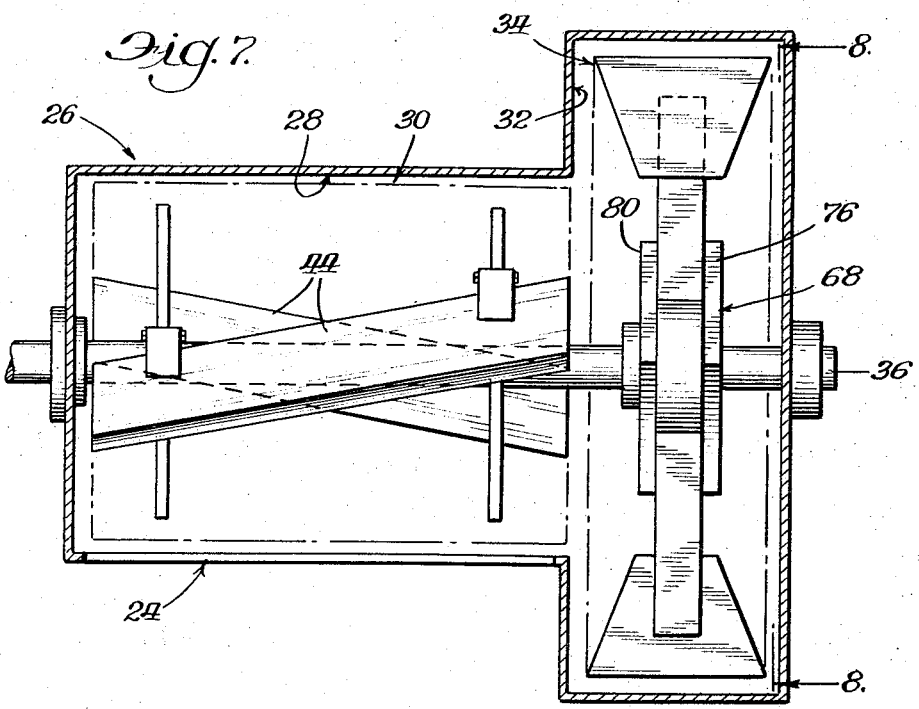
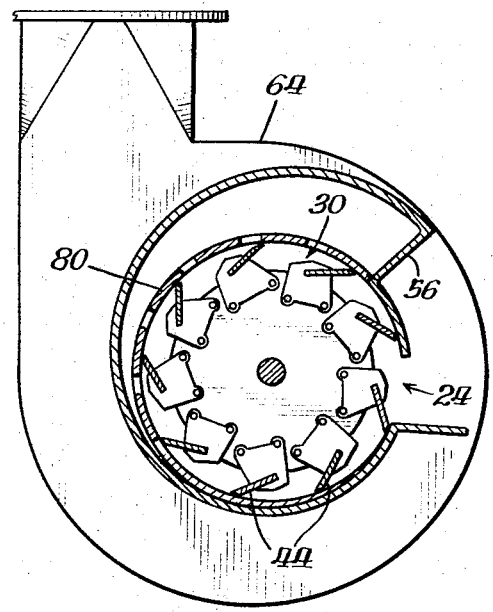
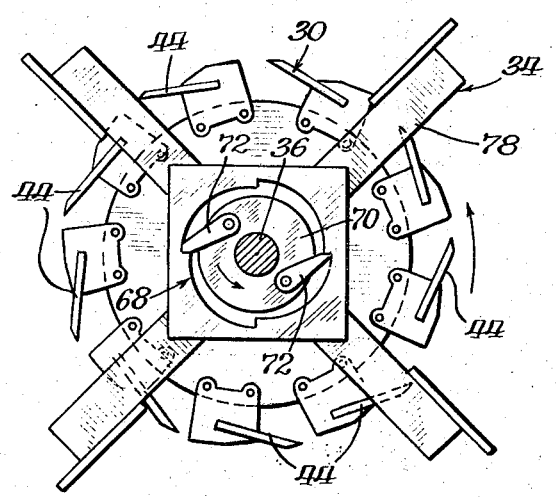
Inventor:
Manfried L. Hoch
John J. Kowalik
Atty.

United States Patent Office 3,348,594
Patented Oct. 24, 1967

3,348,594
FORAGE HARVESTER
Manfried L. Hoch, Lockport, Ill., assignor to International Harvester Company, Chicago, Ill., a corporation of New Jersey
Filed Sept. 3, 1965, Ser. No. 484,830
12 Claims. (Cl. 146—107)

ABSTRACT OF THE DISCLOSURE

A cutter head and blower mounted coaxially and a housing enveloping the cutter and having a material inlet transaxially of the cutter head and the housing having an element disposed transaxially of the cutter head for deflecting cut plant particles into the blower.

The present invention relates to a forage harvester.

The invention relates more particularly to a combination cutter head and blower for use in a forage harvester.

A forage harvester of the type to which the present invention is particularly applicable, cuts crop plants as it moves therealong and picks up or gathers the cut plants, and performs an additional operation thereon. Such additional operation usually is in the form of recutting, shredding or otherwise comminuting the plants, and throwing or blowing them to a receptacle such as a wagon or truck.

A broad object of the present invention is to provide a novel combination cutter head and blower unit for performing an additional operation on cut plants and specifically for recutting the plants and throwing or blowing them through a conduit for delivering them to a receptacle.

Another broad object is to provide a combination cutter head and blower unit serving to reduce damage to the device upon encountering an obstacle in the operation of the forage harvester in which it is incorporated, as compared with apparatus of this general character heretofore known.

More specifically, an object of the invention is to provide a novel device of the character referred to having a cutter head and blower mounted on a common shaft and driven by a single source of power, and in which overrunning clutch means is interposed between the shaft and blower whereby to enable the blower to continue running after the cutter head slows down or stops, in the event that the cutter head encounters an obstacle.

Another and more specific object of the invention is to provide a unit of the character above referred to, which includes a cutter head and a blower, whereby the cutter head is not utilized for delivering the cut plants directly to a receptacle, and whereby the cutter head can be made of much smaller diametral dimensions than the blower, with consequent greater efficiency in cutting the plants.

Still another object is to provide a combination cutter head and blower of the foregoing character which includes a housing in which the cutter head and blower are both mounted, and in which the housing includes a novel construction cooperating with the cutter head for delivering the cut plants from the cutter head to the blower.

Another object of the invention is to provide a cutter head and blower of the foregoing general character wherein the cutter head is not utilized for delivering the cut plants directly to a receptacle, but the blower is utilized for this purpose, whereby the cutter head can be made of much smaller diametral dimensions and thereby its inertia is reduced so that upon encountering an obstacle by the cutter head, the possibility of damage is greatly reduced.

A further object is to provide a cutter head and blower unit of the foregoing general character, in which the cutter head and blower are mounted in co-axial relation and the cutter head cuts the plants and delivers them to the blower, and in which the direction of movement of the cut plants into the blower includes a major component of movement in the direction of rotation of the blower, with consequent less power consumption and greater efficiency of operation.

Various other advantages of the invention include simplicity of construction and corresponding better appearance; substantial saving in weight; reduction in service costs; less power consumption; and facility of maintenance.

Other objects and advantages of the invention will appear from the following detailed description taken in conjunction with the accompanying drawings in which:

FIGURE 3 is a sectional view taken at line 3—3 of FIGURE 1;

FIGURE 4 is a sectional view, partially developed, taken at line 4—4 of FIGURE 1;

FIGURE 5 is an end view, on a small scale, of the unit of FIGURE 1, taken from the front and to the left of FIGURE 1;

FIGURE 6 is a small scale plan view of the unit, taken at line 6—6 of FIGURE 5;

FIGURE 7 is an axial sectional view taken at line 7—7 of FIGURE 1;

FIGURE 8 is an end view taken at line 8—8 of FIGURE 7 but omitting the housing; and FIGURE 9 is a view similar to FIGURE 3 but including a recutter screen.

Figure 1:
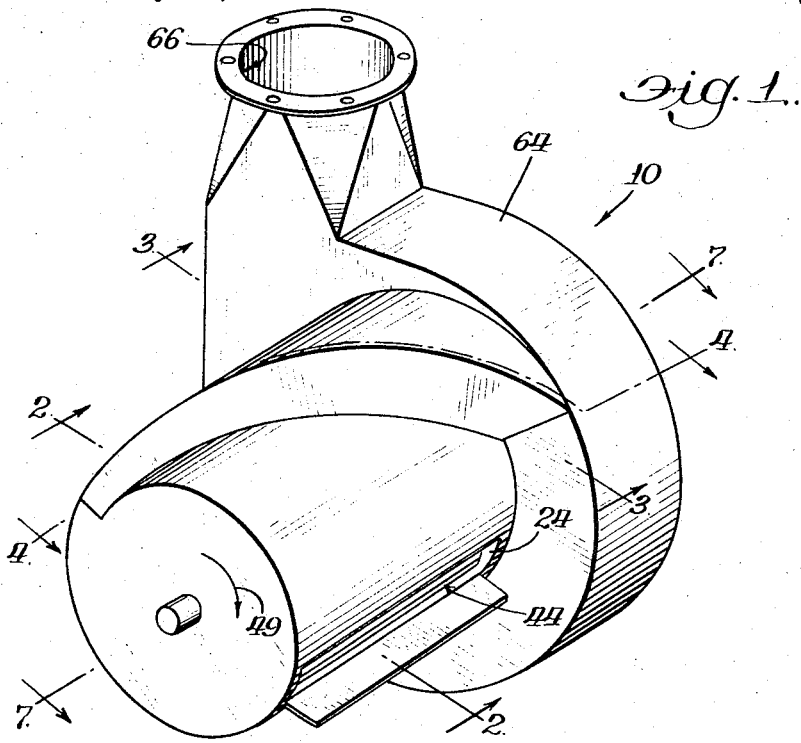
FIGURE 1 is a perspective view of the exterior of the combination cutter head and blower unit of the invention.
Figure 2:
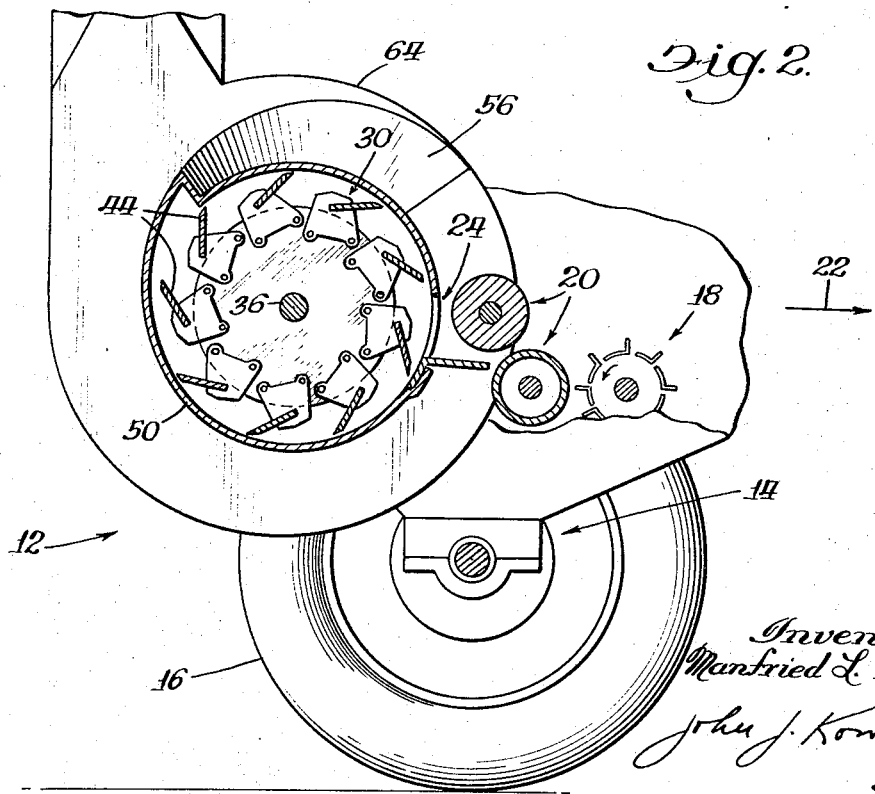
FIGURE 2 is a large scale sectional view taken at line 2—2 of FIGURE 1 and including other elements or components of the harvester in which the apparatus is incorporated.

Referring now in detail to the drawings, attention is directed first to FIGURES 1 and 2 showing the combination cutter head and blower unit, and showing its relation to certain other components in the forage harvester in which it is incorporated. The unit is indicated at 10 and is shown incorporated in a forage harvester indicated in its entirety at 12. The forage harvester is of any suitable type and includes a frame 14 mounted on wheels 16, a conveyor 18 and a pair of metering rolls 20. The harvester is arranged for traveling along the crop plants, to the right as viewed in FIGURE 2 and as indicated by the arrow 22. The harvester includes suitable means (not shown) for cutting the standing plants, the plants after being so cut being delivered by the conveyor 18, which is here shown semi-diagrammatically, toward the unit 10. Upon leaving the conveyor 18, the cut crop plants are delivered to the metering rolls 20 which transmit the cut plants to the unit 10, and specifically through an opening 24 in the housing 26 of the unit 10, which will be referred to again hereinbelow. The foregoing is believed sufficient to characterize the forage harvester and the remaining description of the apparatus will be directed to the combination cutter head and blower unit 10 and its function after delivery thereto of the cut crop plants as referred to above.

Referring now to the detail construction of the unit 10, the housing 26 has a chamber 28 in which is disposed a cutter head 30 and a chamber 32 in which is disposed a blower 34. The cutter head and blower are mounted on a common shaft 36 mounted in the housing in suitable bearings, and at one end of the shaft is a sprocket 38 on the splined shaft adapted for being driven by a single source of power in the harvester in a known manner. As will be brought out in detail hereinbelow both the cutter head and the blower are driven by this single source of power through the pulley 38 and shaft 36.

The cutter head 30 in general may be of any suitable construction, the details of which do not as such enter into the present invention. The cutter head is fixed to the shaft and includes a plurality of knives 44, for example nine. The knives are disposed close to a position perpendicular to the radii of the cutter head but are of helical shape with their cutting edges lying in a cylindrical surface. The housing is provided with a shear plate 46 at the bottom of the opening 24, this plate aiding in the movement of the cut crop plants into the housing and also providing a shear edge 48 along its inner edge against which the knives of the cutter head work in cutting or comminuting the crop plants, the cutter head rotating in the direction of the arrow 49, FIGURE 3.

The chamber 28 of the housing in which the cutter head is disposed preferably opens throughout its full transverse extent into the chamber 32 in which the blower is mounted, and the housing is specially constructed to cooperate in a novel manner with the cutter head for conveying the cut crop particles into the blower chamber. The cutter head chamber 28 is defined by a surrounding wall 50 which in one portion 52 is substantially cylindrical, this portion being disposed at the right as viewed in FIGURE 3 and containing the opening 24, as indicated by the angle $a$. This cylindrical portion 52 may be of about 90° in extent angularly of the housing, although it is not limited to that extent, and it is of course coaxial with the axis of rotation of the cuter head. Progressing beyond the portion 52, the housing includes a portion 54 indicated by the angle $b$ which spirals outwardly forming a scroll and terminating in an abrupt terminal wall element 56. The portion 54 increases in radial direction uniformly along its axial extent, i.e., an axial-radial plane would cut the wall in a line parallel with the axis of the shaft. The terminal wall element 56 follows a helical path and hence increases in radial dimension from its outer end toward the blower. In the present illustration, this wall element is so shaped that at every point along its length it extends radially of the axis of the shaft, but within the broad scope of the invention, it may be inclined in either direction from that position.

The scroll 54, and particularly the terminal wall element 56 thereof deflects the cut plant particles from the cutter head to the blower. The cutter head throws the plant particles outwardly and circumferentially, and as they follow around the housing, they eventually engage the terminal wall element 56. This wall element is disposed at a substantial angle to the path of the plant particles and deflects them into the blower housing as stated, with very small loss in speed. It will be appreciated that progressing from the outer end of the housing toward the blower housing, the plant particles accumulate and increase in volume and this phenomenon is accommodated by the increase in radial dimension of the scroll immediately anterior to the wall element 56, in direction from the outer end of the housing toward the blower.

While dimensions and proportions of the scroll 54 may vary within a wide range, the following are dimensions of one embodiment considered practical and efficient: length of the cutter head housing 20"; base diameter of the cutter head housing, i.e., according to the radius of the portion 52: 18"; the angular extent of the terminal wall element 56 as indicated by the angle $c$ of FIGURE 5: 120°; and the increase in radial dimension of the terminal wall element 56 from the outer end of the housing to the end thereof adjacent the blower housing: from 2" to 6".

The blower chamber 32 is defined by a wall element 64, which forms an outlet passage 66 in the usual manner. The blower 34 in itself may be of any desired construction except that it is mounted on the shaft 36 by an overrunning clutch indicated in its entirety at 68 (FIGURE 8). This over-running clutch may be of any suitable kind having a rotor 70 fixed on the shaft 36 and pawls 72 pivoted thereon and biased outwardly for engagement with notches 74 formed in a plate 76. The plate 76 and the vanes 78 of the blower, together with other structural elements such as another plate 80 (FIGURE 6), constitute the blower proper. It will be noted that the blower is of much greater diameter than the cutter head. In the normal operation the shaft is driven as stated above, through the pulley 38, always in the same direction, and it drives the cutter head and the blower therewith. Upon stopping or slowing down of the cutter head, and thus the shaft 36, the over-running clutch 68 permits the blower to over-run the shaft and continue running until it stops from other forces, e.g., bearing friction and air resistance.

Another advantage of the device is that a re-cutter screen may be utilized for sizing and re-cutting the plants. Such a screen is shown at 80 in FIGURE 9. This screen is mounted in the cutter head chamber 28 in underlying relation to the spiral portion 54 of the housing, concentric with the axis of the cutter head and thus forming a continuation of the portion 52 of the housing. The screen provides an effective re-cutting and sizing device with only a relatively small reduction in the force driving the plant particles into the blower housing.

FIGURE 6 shows an angle $d$ between the scroll, as defined by the terminal wall element 56, at its emergence into the blower housing, and the direction of rotation of the blower. This angle indicates the direction of the movement of the plant particles into the blower chamber. An angle of approximately 35° would result in a highly efficient operation. This direction includes a large component of direction of the plant particles in the direction of rotation of the blower.

This angle $d$ is not limited to the range given, and may assume a much smaller angle. The greater the extent of the terminal wall element 56 angularly of the housing, the less will be the angle $d$, and in the example given in which the concentric cylindrical housing portion 52 is 90°, the terminal wall element 56 may extend to as much as 270°.

In the event that the cutter head should encounter an obstacle and cause it to stop, a minimum of damage would occur because of the over-running feature of the blower. Another factor that would minimize such damage is that since the cutter head is not relied on solely to deliver the cut plant particles to the receptacle, it can be made of much smaller diameter than the blower. This renders the entire unit more compact and smaller for producing any given performance and a smaller cutter head will more readily yield and come to a complete stop upon encountering an obstacle. Much lighter components can be utilized in the construction because of separating the functions of the cutter head and blower.

Since the cutter head is not relied on for so delivering the plant particles to the receptacle, the knives thereof can be mounted more nearly perpendicular to the radii, the position of their most effective strength. This positioning of the knives will also produce a greater shearing force. Also, a greater shearing force is provided by a small diameter cutter head, given a constant torque input.

The present construction also provides advantages over previously known constructions using separate cutter heads and blowers. In the present case, less power consumption is required, as compared with blower and cutter head mounted on separate shafts and in separate bearings and requiring separate drives.

Another distinct advantage of the present arrangement is that the plant particles on being deflected into the blower housing by the terminal wall element 56, move in a direction close to the direction of rotation of the blower, thus producing greater efficiency, as contrasted with apparatus heretofore known in which the plant particles move into the blower housing at a 90° angle to the direction of rotation of the blower. A further advantage is that the knives in the cutter head can be sharpened while in place, eliminating the necessity for removing them for that purpose and thus providing a great time saving.

An additional advantage of the present invention is that the throat opening 24 is of rectangular shape resulting in greater efficiency in feeding of the plant particles therethrough. Moreover it extends the full length of the cutter head and the cutting velocity of the cutter head along the throat is uniform, making more efficient use of the power available.

While I have disclosed and claimed herein a certain preferred form of the invention it will be understood that changes may be made therein within the spirit and scope of the appended claims.

I claim:

1. A combination cutter head and blower unit comprising, a housing, a cutter head and a blower operatively mounted in the housing, the housing having an entrance opening to the cutter head and an exit opening from the blower, the cutter head being operative for cutting plants received through said entrance opening, the housing comprising means for deflecting cut plant particles from the cutter head to the blower in a direction containing a large component of the direction of rotation of the blower.

2. The invention set out in claim 1 wherein the impelling force for so delivering the cut plant particles is produced by the cutter head.

3. A combination cutter head and blower unit comprising a housing, a cutter head and a blower operatively mounted in the housing in co-axial relation, the housing having an entrance opening to the cutter head and an exit opening from the blower, the cutter head being operative for cutting plants received through the entrance opening and producing a stream of cut plant particles in a generally circumferential stream, and the housing having an element disposed transaxially of the cutter head for deflecting the cut plant particles into the blower.

4. The invention set out in claim 3 wherein the cutter head and blower are mounted on a common shaft, and said deflecting element has a terminal end portion adjacent the blower disposed at an acute angle to the plane of rotation of the blower.

5. A combination cutter head and blower unit comprising a housing defining a generally circular cutter head chamber and a blower chamber, a rotary cutter head operatively mounted in the cutter head chamber, and a blower operatively mounted in the blower chamber, the housing having an entrance opening to the cutter head chamber and defining a scroll leading from a point posterior to the entrance opening in the direction of rotation of the cutter head and continuing therearound in progressively increased radius and terminating in a generally helical wall element having a radial component of direction, the cutter head chamber communicating with the blower head chamber at least in an area immediately anterior to said terminal wall element.

6. The invention set out in claim 5 wherein said entrance opening and terminal wall element extend substantially the full axial extent of the cutter head.

7. The invention set out in claim 6 wherein the portion of the housing in which the entrance opening is formed is generally cylindrical, the opening is of full circumferential extent throughout its axial length, and a shearing edge is provided at the inner edge of opening extending the full axial length of the cutter head against which the cutter head works in cutting action.

8. A combination cutter head and blower unit comprising a housing defining a generally circular cutter head chamber and a blower chamber, a rotary cutter head operatively mounted in the cutter head chamber, and a blower operatively mounted in the blower chamber, the housing having an entrance opening to the cutter head chamber and defining a scroll leading from a point posterior to the entrance opening in the direction of rotation of the cutter head and continuing therearound in progressively increased radius and terminating in a generally helical wall element having a radial component of direction, said terminal wall element extending angularly of the cutter head chamber at least in the neighborhood of 90°.

9. A combination cutter head and blower unit comprising a housing defining a generally circular cutter head chamber and a blower chamber, a rotary cutter head operatively mounted in the cutter head chamber, and a blower operatively mounted in the blower chamber, the housing having an entrance opening to the cutter head chamber and defining a scroll leading from a point posterior to the entrance opening in the direction of rotation of the cutter head and continuing therearound in progressively increased radius and terminating in a generally helical wall element having a radial component of direction, said terminal wall element increasing in radial direction axially toward the blower housing.

10. The invention set out in claim 9 wherein the terminal wall element increases in radial direction from about 11% of the basic diameter of the cutter head chamber to about 33% of that diameter.

11. A combination cutter head and blower unit, comprising a housing, a cutter head and a blower and means operatively mounting them in the housing and adapted for operative connection with common driving means, said housing having a material inlet extending transversely of the axis of rotation of the cutter head, over-running clutch means operatively interposed between the mounting means and the blower, the housing having an entrance opening to the cutter head and an exit opening from the blower, the cutter head being operative for cutting plants received through said entrance opening, the housing having means operative to deliver cut plant particles from the cutter head to the blower in a direction containing a large component of the direction of rotation of the blower.

12. A combination cutter head and blower unit, comprising, a generally circular housing defining a cutter head chamber and a blower chamber inter-communicating substantially throughout the transverse extent of the cutter head chamber, a cutter head in the cutter head chamber and a blower in the blower chamber, a common shaft drivingly mounting the cutter head and blower in co-axial relation, over-running clutch means operatively interposed between the shaft and blower, the housing having a material inlet opening to the cutter head chamber extending substantially the full axial length of the cutter head transversely of the axis of rotation of the cutter head, the housing including means for deflecting cut plant particles from the cutter head chamber into the blower chamber in a direction containing a substantial component in the direction of rotation of the blower, the blower being of substantially greater diameter than the cutter head, and the housing having a delivery opening from the blower chamber.

References Cited

UNITED STATES PATENTS

| 639,015 | 12/1899 | Bray | 146—107 |
| 1,289,004 | 12/1918 | Rosenthal | 146—107 |
| 1,713,094 | 5/1929 | Saiberlich et al. | 146—107 |
| 2,504,328 | 4/1950 | Hansen | 146—107 |

W. GRAYDON ABERCROMBIE, *Primary Examiner.*